United States Patent [19]

Okada et al.

[11] 4,438,021

[45] Mar. 20, 1984

[54] CATALYST FOR DEHYDROCOUPLING OF TOLUENE OR XYLENE

[75] Inventors: Yoshio Okada; Takashi Terauchi; Makoto Naoki; Masatoshi Hino, all of Iwaki, Japan

[73] Assignee: Kureha Kagaku Kogyo Kabushiki Kaisha, Tokyo, Japan

[21] Appl. No.: 358,214

[22] Filed: Mar. 15, 1982

[30] Foreign Application Priority Data

Mar. 27, 1981 [JP] Japan ................................. 56-46018
Mar. 27, 1981 [JP] Japan ................................. 56-46019
Mar. 27, 1981 [JP] Japan ................................. 56-46020

[51] Int. Cl.³ ............................................. B01J 23/06
[52] U.S. Cl. ................................. 502/341; 585/428
[58] Field of Search ................. 252/463; 585/428; 423/593

[56] References Cited

U.S. PATENT DOCUMENTS 3,963,793  6/1976  Weterings ................... 252/463 X
4,243,825  1/1981  Williamson et al. ............... 585/428
4,268,703  5/1981  Williamson et al. ............... 585/428
4,268,704  5/1981  Tremont et al. ............... 252/463 X

*Primary Examiner*—W. J. Shine
*Attorney, Agent, or Firm*—Wegner & Bretschneider

[57] ABSTRACT

Disclosed herein is a catalyst suitable for dehydrocoupling of toluene or xylene, represented by the general formula (I):

$$M_a Tl_b O_c \qquad (I),$$

wherein M represents yttrium, zinc or zirconium; a denotes a number in a range of 0.25 to 5, b denotes 1, and c denotes a number necessary for fulfilling the respective average atomic valencies of M and Tl in the oxidation states in which they exist in the composition represented by the formula (I), and a process for dehydrocoupling of toluene or xylene in the presence of the catalyst represented by the general formula (I).

1 Claim, No Drawings

CATALYST FOR DEHYDROCOUPLING OF TOLUENE OR XYLENE

BACKGROUND OF THE INVENTION

The present invention relates to a catalyst suitable for dehydrocoupling of toluene or xylene, and a process for dehydrocoupling of toluene or xylene in the presence of the catalyst.

Processes for synthesizing 1,2-diphenylethane or 1,2-diphenylethylene and these derivatives by dehydrogenation of toluene or xylene have been numerously known hitherto. For instance, processes of these dehydrogenation which utilize halogen, sulfur, carbon disulfide and the like as the hydrogen acceptor have been known for a long time, however, there are several inconveniences in these processes such as the high cost of the hydrogen acceptor, the formation of corrosive substances and the contamination of the product by halides and sulfides.

As a process in which the inconveniences in the dehydrogenation have been raveled out, a process of using oxygen as the hydrogen acceptor has been proposed, and the possible use of a metal oxide such as lead oxide as the oxygen source for the hydrogen acceptor has been disclosed in U.S. Pat. No. 3,963,793. Namely, in the disclosed process, propene, toluene, acetic acid and other compounds can be converted into the respective dehydrocoupled compounds in the presence of "a reagent which contains oxygen and can be regenerated" and in the absence of free molecular oxygen. "The reagent which contains oxygen and can be regenerated" mentioned herein is a specified metal oxide, and in U.S. Pat. No. 3,963,793, thallium trioxide is disclosed other than bismuth trioxide. Many proposals have been given for dimerization using such a metal oxide as the catalyst, and it has been known that various metal oxides are respectively effective as a catalyst in dimerization.

In addition, as the metal oxide, lead oxide, thallium oxide, bismuth oxide and other oxides have been known as in U.S. Pat. No. 4,243,825, however, the effectiveness of these oxides themselves is not so remarkable as the catalyst in dimerization.

Accordingly, in U.S. Pat. No. 3,963,793, a method in which thallium oxide or bismuth oxide is carried on a basic carrier of a specific surface area of higher than 20 m²/g in order to raise the catalytic activity of each oxide is disclosed.

The object of the present invention is to provide a catalyst which is useful to the dehydrocoupling of toluene or xylene into 1,2-diphenylethane and 1,2-diphenylethylene or 1,2-ditolylethane and 1,2-ditolylethylene in an improved yield, and is to provide a process for profitably dehydrocoupling toluene or xylene by the use of the catalyst provided by the present invention.

SUMMARY OF THE INVENTION

In first aspect of the present invention, there is provided a catalyst for dehydrocoupling of toluene or xylene, represented by the general formula (I):

$$M_aTl_bO_c \qquad (I)$$

wherein M represents yttrium, zinc or zirconium; a is a number in a range of 0.25 to 5; b is 1 and c is a number necessary for fulfilling the average atomic valencies of M and Tl in the oxidation state in the formula (I).

In second aspect of the present invention, there is provided a process for dehydrocoupling of toluene or xylene, comprising heating gaseous toluene or xylene in the presence of a catalyst represented by the general formula (I); $M_aTl_bO_c$, wherein M represents yttrium, zinc or zirconium; a is a number in a range of 0.25 to 5; b is 1 and c is a number necessary for fulfilling the respective average atomic valencies of M and Tl.

DETAILED DESCRIPTION OF THE INVENTION

The catalyst of the present invention is thallium oxide which is activated by yttrium oxide, zinc oxide or zirconium oxide and comprises the metal oxide represented by the general formula (I): $M_aTl_bO_c$, wherein M represents yttrium, zinc or zirconium; a is a number in a range of 0.25 to 5; b is 1 and c is a number necessary for fulfilling the respective average atomic valencies of M and Tl in the oxidation states in which they exist in the composition represented by the formula (I), and can be prepared by mixing yttrium oxide, zinc oxide or zirconium oxide with thallium oxide so that the composition of the mixture becomes to the desired one and after shaping and drying, by baking the dried composition at a temperature of 600° to 800° C.

Each of yttrium oxide, zinc oxide and zirconium oxide is low in catalytic activity, however, by the calcination, thallium oxide is activated to convert highly toluene or xylene to the oxidative dehydrogenating products.

The catalyst according to the present invention may be used in association with a support or carrier, for instance, silica, alumina, silica-alumina or the like.

Furthermore, in the case where M is yttrium or zirconium, the catalyst is highly active in converting toluene or xylene provided that a is in a range of 0.4 to 2.0 and b is 1, and in the case where M is zinc, the catalyst is also highly active in converting toluene or xylene provided that a is in a range of 0.4 to 1.7 and b is 1.

The process for oxidative dehydrocoupling of toluene or xylene according to the present invention is characterized in that a gas containing toluene or xylene is heated in the presence of the catalyst represented by the general formula (I). In the process according to the present invention, toluene or xylene is reacted in a gas phase, and such a hydrocarbon may be used singly or may be used as a gaseous mixture with a chemically inert gas such as nitrogen and helium, and may be used after mixing with water vapour. In the reaction, since water vapour suppresses the combustion of toluene or xylene (combustion of the hydrocarbon forms carbon dioxide and water) in the reaction in the presence of the catalyst, the use of a gaseous mixture of toluene or xylene with water vapour as the starting material is preferable in the prosecution of the process according to the present invention. The mixing ratio of water vapour to toluene or xylene is suitable in a range of 0.5 to 3 by mole.

The oxidative dehydrocoupling of toluene or xylene is carried out by supplying toluene or xylene in a vapour state into a reactor provided with a layer of the metal oxides as the catalyst according to the present invention, while heating the reaction system at a temperature of 500° to 650° C., preferably 550° to 630° C. and under an ordinary pressure or a reduced pressure or an elevated pressure, the contact time of toluene or xylene with the metal oxide as the catalyst being 0.1 to 2 sec, preferably 0.3 to 1 sec.

In addition, although toluene or xylene is heated to be a gas in advance of supplying into the reactor, the hydrocarbon may be supplied as a liquid and then vaporized within the reactor by heating.

According to the present invention, toluene or xylene can be continuously dehydrocoupled by using the catalyst as a fluidized bed or a moving bed and by carrying out the reduction and oxidation of the catalyst continuously in a repeated manner. On the other hand, the dehydrocoupling can be carried out intermittently while using the catalyst as a fixed bed. The regeneration of the once used catalyst can be carried out at 400° to 600° C. for 10 to 60 min. in air or in gaseous oxygen in accordance with the particle size and the degree of reduction of the catalyst.

The improvement in the conversion rate of toluene or xylene according to the process of the present invention will be clearly understood from Examples shown later.

However, the present invention is not restricted to Examples under mentioned. From the foregoing description, one skilled in the art can easily ascertain the essential characteristics of this invention, and without departing from the spirit and scope thereof, can make various changes and modifications of the invention to adapt it to various usages and conditions.

EXAMPLE 1

Preparation of the catalyst of the present invention (1) Thallium oxide activated by yttrium oxide After adding 110 g of water to a mixture of 274.0 g of $Tl_2O_3$ and 135.5 g of $Y_2O_3$, and blending the mixture well, water of the mixture was evaporated off by heating the mixture. After drying the mixture for 10 hours at 150° C., the dried mixture was calcined for 3 hours at 700° C., and the thus obtained mixed oxide was crushed into granules of 500 to 2000 microns in size. The thus prepared catalyst had an atomic ratio of Tl:Y of 1:1.

(2) Thallium oxide activated by zinc oxide

After adding 110 g of water to a mixture of 237.6 g of $Tl_2O_3$ and 166.0 g of ZnO, and blending the mixture well, water was evaporated by heating the blended mixture. After further drying the mixture for 10 hours at 150° C., it was calcined for 3 hours at 700° C. and the thus obtained mixture of oxides was crushed into particles of 500 to 2000 microns in representative size. The thus obtained catalyst had an atomic ratio of thallium to zinc of 1:2.

(3) Thallium oxide activated by zirconium oxide

After adding 110 g of water to a mixture of 194.1 g of $Tl_2O_3$ and 209.5 g of $ZrO_2$, and blending the mixture well, the mixture was subjected to quite the same treatments as in Example 1 (1) to obtain a catalyst with an atomic ratio of thallium to zirconium of 1:2.

EXAMPLE 2

Dehydrocoupling of toluene

A stainless-steel tube of 25 mm in diameter and of 1000 mm in length was filled with 50 ml of each of the catalyst obtained in Example 1 (1) to (3), and then, while using the tube as a reactor and heating the reactor by a heater fitted onto the external wall of the reactor to a predetermined temperature (refer to Table 1 shown below), gasified toluene and water vapour were introduced together into the reactor at the respective flow rates of 150 and 53 ml/hour for 10 min to bring into reaction under the heating.

The thus obtained gaseous reaction mixture was introduced into a gas chromatograph via a collector placed at the outlet of the reactor to analyze the composition thereof. The percentage of conversion of toluene (a ratio of the amount of toluene reacted to the amount of toluene supplied, multiplied by 100) and the percentage of selectivity (the ratio of the amount of each product to the amount of reacted toluene, multiplied by 100, products being the dimer, benzene and carbon dioxide) are shown in Table 1. The dimer herein mentioned means 1,2-diphenylethane and 1,2-diphenylethylene produced by the reaction, and accordingly, the amount of the dimer corresponds to the sum of the amounts of 1,2-diphenylethane and 1,2-diphenylethylene, respectively.

COMPARATIVE EXAMPLE 1

In the same reactor as in Example 2, dimerization of toluene was carried out in the similar manner as in Example 2, however, while using each of not-yet activated single oxides of thallium, yttrium, zinc or zirconium. The results are shown also in Table 1 in the same pattern as in Example 2.

As are seen in Table 1, the percentage of conversion of toluene by the catalyst according to the present invention, in which thallium oxide has been activated by zinc oxide, zirconium oxide, or yttrium oxide, illustrate a remarkable improvement as compared to the percentage of conversion of toluene by the catalyst not yet activated.

EXAMPLE 3

While using the catalyst (1), (2) and (3) prepared in Example 1, and carrying out the reaction in the same manner as in Example 2 for dimerization of xylene.

The results are shown in Table 2 while using the same pattern of expression, namely the percentage conversion of xylene and the percentage selectivity to each of the products, wherein the dimer means 1,2-ditolylethane and 1,2-ditolyethylene.

TABLE 1

| Run | Atomic ratio of metal in catalyst | Reaction temperature (°C.) | Conversion (%) | Selectivity (%) | | |
|---|---|---|---|---|---|---|
| | | | | Dimer | Benzene | Carbon dioxide |
| Example 2 | | | | | | |
| (1) | Tl:Y = 1:1 | 600 | 25.1 | 79.2 | 8.1 | 5.3 |
| (2) | Tl:Zn = 1:2 | 600 | 28.9 | 70.5 | 10.7 | 10.9 |
| (3) | Tl:Zr = 1:2 | 600 | 23.3 | 79.2 | 4.9 | 6.8 |
| Comparative Example 1 | | | | | | |
| (1) | (only $Tl_2O_3$) | 600 | 9.2 | 78.2 | 4.8 | 11.9 |
| (2) | (only $Y_2O_3$) | 600 | 3.7 | 91.5 | 2.1 | 0.2 |
| (3) | (only ZnO) | 600 | 1.3 | — | — | — |
| (4) | (only $ZrO_2$) | 600 | 1.7 | 81.5 | 1.0 | 0.6 |

TABLE 2

| Run | Atomic ratio of metals in catalyst | Reaction temperature (°C.) | Conversion (%) | Selectivity (%) | |
|---|---|---|---|---|---|
| | | | | Dimer | Carbon dioxide |
| Example 3 | | | | | |
| (1) | Tl:Y = 1:1 | 600 | 21.1 | 73.2 | 8.8 |
| (2) | Tl:Zn = 1:2 | 600 | 29.7 | 69.1 | 11.6 |

TABLE 2-continued

| Run | Atomic ratio of metals in catalyst | Reaction temperature (°C.) | Conversion (%) | Selectivity (%) Dimer | Carbon dioxide |
|---|---|---|---|---|---|
| (3) | Tl:Zr = 1:1 | 600 | 25.0 | 71.8 | 9.5 |

What is claimed is:

1. A catalyst for dehydrocoupling of toluene or xylene, consisting essentially of an activated catalyst composition represented by the general formula (I):

$$Zn_aTl_bO_c \qquad (I),$$

where a denotes a number in a range of 0.25 to 5; b is 1 and c denotes a number necessary for fulfilling the respective average atomic valencies of Zn and Tl in the oxidation states in which they exist in the composition.

* * * * *